United States Patent [19]

Tse

[11] Patent Number: 5,351,432

[45] Date of Patent: Oct. 4, 1994

[54] FLOAT WITH LIGHT EMITTING DEVICES

[75] Inventor: Steven Tse, Yung Ho City, Taiwan

[73] Assignee: Meng-Chin Tseng, Taichung, Taiwan

[21] Appl. No.: 103,484

[22] Filed: Aug. 6, 1993

[51] Int. Cl.⁵ .............................................. A01K 93/00
[52] U.S. Cl. .......................................... 43/17.5; 43/17
[58] Field of Search ................................. 43/17.5, 17

[56] References Cited

U.S. PATENT DOCUMENTS

| | | | |
|---|---|---|---|
| 2,790,263 | 4/1957 | Chaney | 43/17 |
| 2,914,879 | 12/1959 | Humes | 43/17 |
| 3,105,233 | 9/1963 | D'Amore | 43/17.5 |
| 3,559,224 | 2/1971 | Shimizu | 43/17.5 |
| 4,109,405 | 8/1978 | Ito | 43/17.5 |
| 5,199,205 | 4/1993 | Klammer | 43/17.5 |

FOREIGN PATENT DOCUMENTS

| | | | |
|---|---|---|---|
| 0195782 | 10/1967 | U.S.S.R. | 43/17 |
| 1266501 | 10/1986 | U.S.S.R. | 43/17 |

Primary Examiner—P. Austin Bradley
Assistant Examiner—James Miner
Attorney, Agent, or Firm—Pro-Techtor International

[57] ABSTRACT

A float with light apparatus comprises a floating body which has a guard shaped configuration. The floating body is comprised of a lower housing and an upper housing. The lower housing has an external threaded portion at its lower end, and the upper housing has a cylindrical projection at its upper end. The upper housing and the lower housing jointly define an apartment therebetween. A battery apartment has a cylindrical configuration. The battery apartment has a inner threaded portion at its upper opening for being screwed onto said lower end of the lower housing. A power supply assembly is installed within the battery. The power supply assembly extending further into the lower housing. A first light indicating source is installed onto the upper end of the upper housing. The first light indicating source constructs an electrical connection with the power supply assembly via suitable electrical wires. A second light indicating source is installed within the apartment defined by said lower housing and upper housing. Said second light indicating source constructs an electrical connection with said power supply assembly via suitable electrical wires. An actuating means, slidably mounted onto said cylindrical projection of the upper housing, moves to a triggering position to switch on said second light indicating source as a fish is hooked.

1 Claim, 4 Drawing Sheets

FLOAT WITH LIGHT EMITTING DEVICES

BACKGROUND OF THE INVENTION

This invention relates to a floating device and, more particularly, to a float with light emitting devices which facilitates spotting the position of the float as well as a hooked fish. The fisherman can easily spot the position of the hooked fish and catch it with a landing net.

For a conventional float for night fishing, such as shown in FIG. 1, it is provided with a battery cell 2a within the housing 1a of the float. The top of the conventional float is provided with an LED (light emitting diode) 3a which has a electrical connection with the battery cell. As the float is floating on the water, the fisherman can spot the position of the float via the light emitted from the LED 3a. If the light point of the LED 3a is pitching and rolling vigorously, then the fisherman knows that a fish might be hooked. Though it has a single configuration and easy to operate, we can still conclude the following defects which need to be solved.

1. The conventional float is only provided With a single and simple LED 3a. All the positioning of the float, indicating a fish is hooked etc, depend on the situation of the float, i.e. the situation of LED 3a. Since the LED 3a is too small to spot, the fisherman should pay a all his attention to this. Not only will it cause the eye to become tired, the fisherman will lose the enjoyment of fishing as well.

2. During the night, the wind will make the surface of water ripple or even choppy, accordingly, the float will be pitched and rolled by the ripples. Sometimes, the fisherman will be told with faulty information that a fish is hooked. All night the fisherman is casting and reeling, but not a single fish is caught or even hooked. In this situation, the entertainment provided by fishing is entirely spoiled.

3. As a fish is hooked, the fisherman will use his other hand to hold a spotter to locate the position of the fish. This will no doubt put the fisherman into a muddle. Even the fisherman can wear a headlamp to spot the fish in the water. But the fish can escape to anywhere, and the fisherman shall move according to the escape direction of the fish.

SUMMARY OF THE INVENTION

It is the primary object of this instant invention to provide a float which comprises a first light indicating source and a second light indicating source. This first light indicating source is utilized to indicate the right position of the hooks and the sinkers.

It is still the object of this instant invention whereby an actuating means is provided in a suitable position of the float. As a fish is hooked and the float is drawn into water, the actuating means will trigger a second light indicating source. The fisherman can be apparently advised by this second light indicating source that a fish is hooked.

It is still the object of this invention wherein the second light indicating source provides a sufficient light which the fisherman can clearly and easily see it without other auxiliary light resources.

In order to achieve the objects set forth, this float with light apparatus made according to this invention comprises a floating body which has a gourd-shaped configuration. Said floating body is comprised of a lower housing and an upper housing. Said lower housing has an external threaded portion at its lower end, and said upper housing has a cylindrical projection at its upper end. Said upper housing and said lower housing jointly define an apartment therebetween. A battery apartment has a cylindrical configuration. Said battery apartment has a inner threaded portion at its upper opening for being screwed onto said lower end of said lower housing. A power supply assembly is installed within said battery. Said power supply assembly extending further into said lower housing. A first light indicating source is installed onto said upper end of said upper housing. Said first light indicating source constructs an electrical connection with said power supply assembly via suitable electrical wires. A second light indicating source is installed within said apartment defined by said lower housing and lower housing. Said second light indicating source constructs an electrical connection with said power supply assembly via suitable electrical wires. And an actuating means, slidably mounted onto said cylindrical projection of said upper housing, wherein said actuating means remains at the idle position in a idle position and transforms into a triggering position to switch on said second light indicating device as a fish is hooked.

BRIEF DESCRIPTION OF THE DRAWINGS

The structural and operational characteristics of the present invention and its advantages as compared to the known state of the prior art will be better understood from the following description, relating to the attached drawings which show illustratively but not restrictively an example of a float with light emitting apparatus. In the drawings.

DETAILED DESCRIPTION

Figure 1:
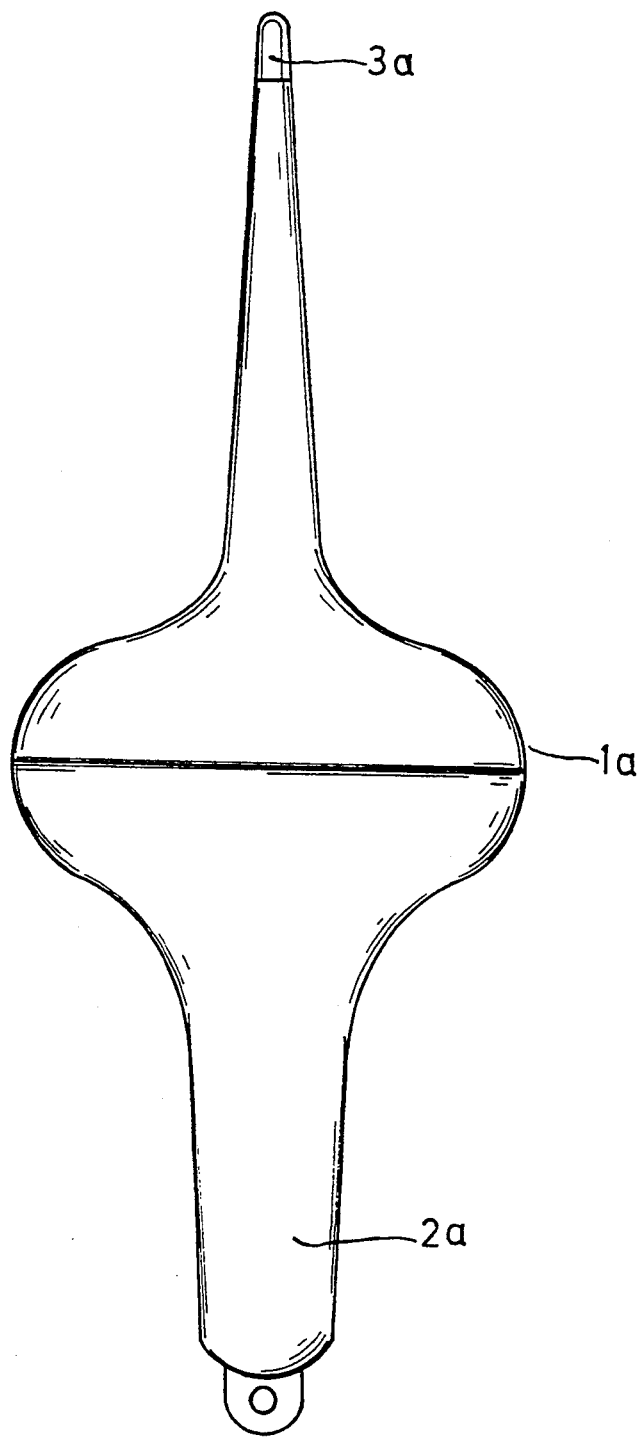
FIG. 1 is a sketch view of a conventional float.
Figure 2:
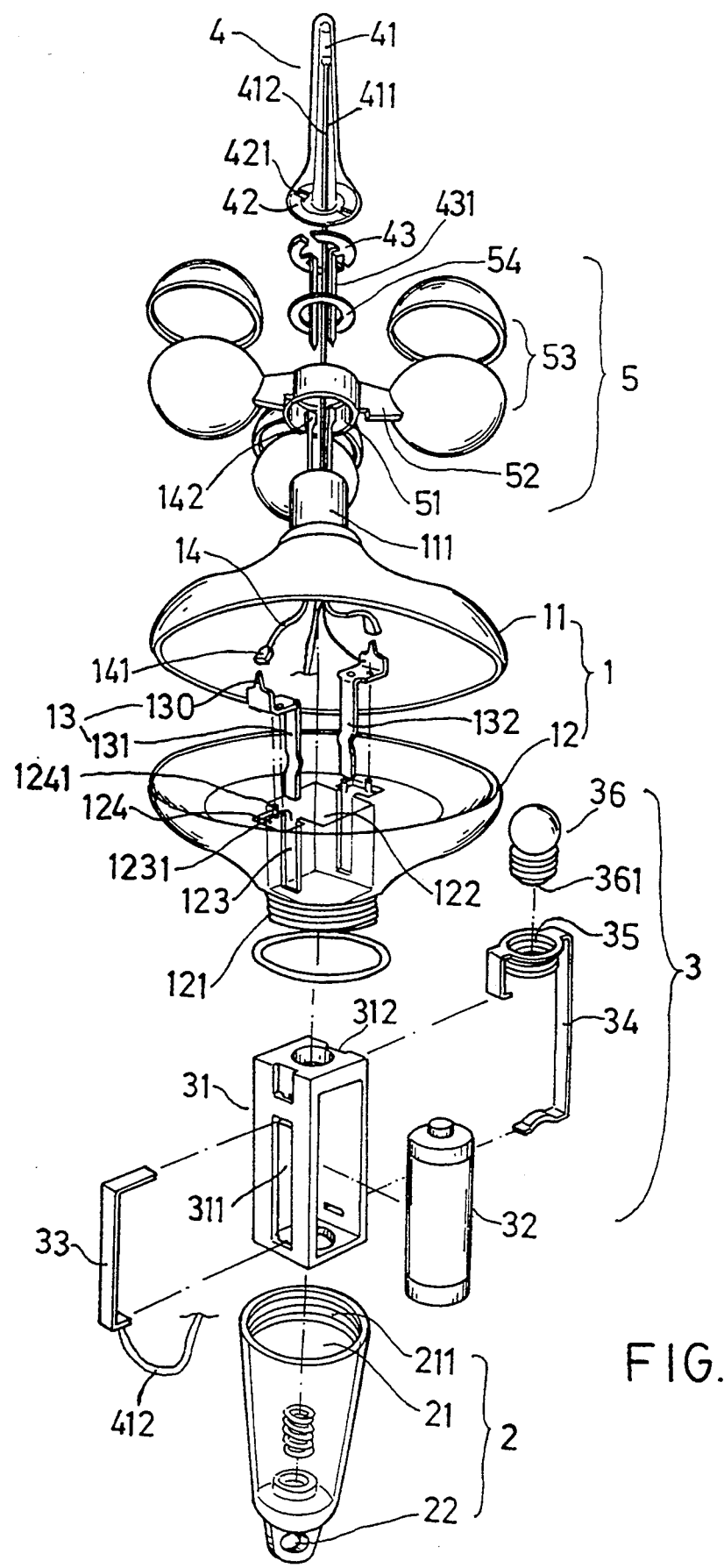
FIG. 2 is an exploded perspective view showing a float made according to this instant invention.
Figure 3:
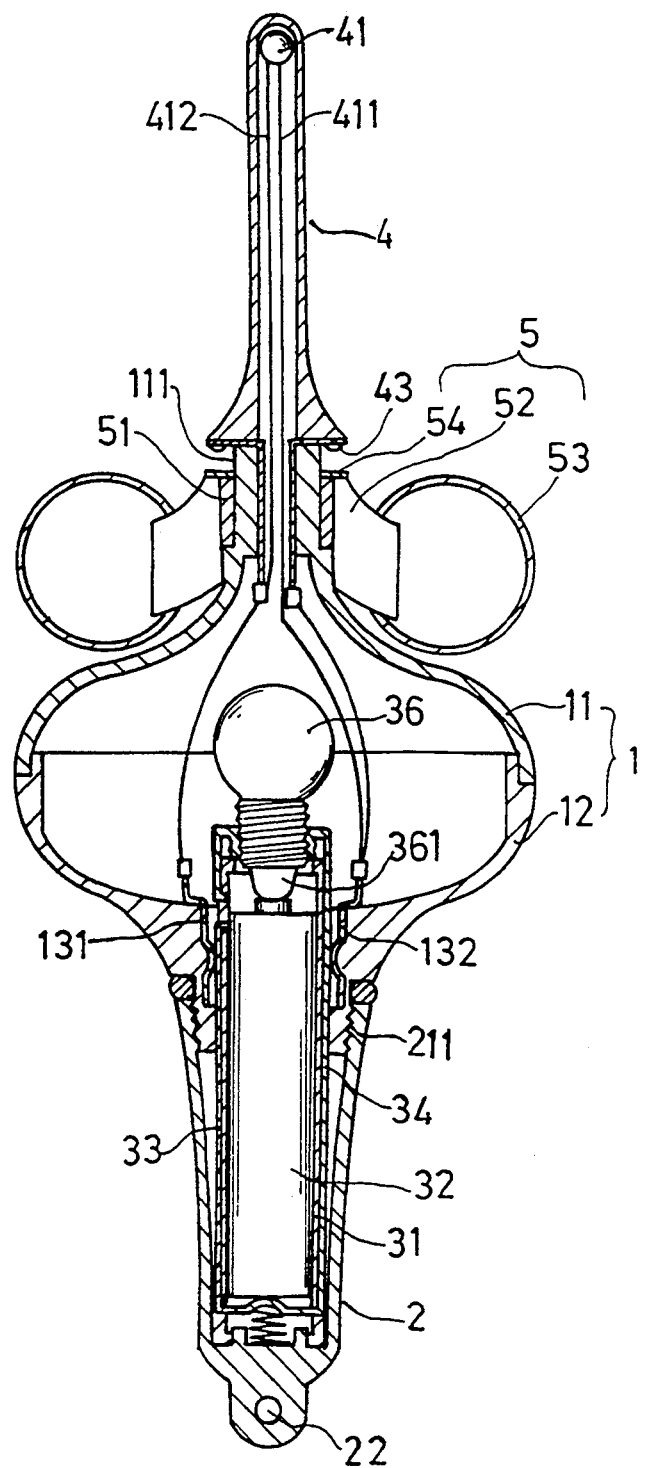
FIG. 3 is a cross sectional view of an assembled float made according to this instant invention.

Referring to Figures and particularly to FIG. 2. A float made according to this invention includes a gourd-shaped floating body 1 which is made from transparent material. This housing 1 further includes a lower housing 12 and an upper housing 11. Said upper housing 11 has a cylindrical projection 111 in its top position. Said lower housing 12 has an external threaded portion 121 at its lower end. Said lower housing 12 is further provided with a securing hole 122 and a clipping groove 123. A recessed plane 124 is formed between said in opening 1231 of said clipping groove 123 and inner wall of said lower housing 12. A tab 1241 is formed on said recessed plane 124 for securing a electrical plate 13. The tip portion 130 of said electrical plate 13 has a electrical connection with a socket 141 fixed with said upper housing 11.

A battery apartment 2 has a cylindrical configuration. This battery apartment 2 has an internal threaded portion 211 on its opening 22. Said battery apartment 2 can be screwed tightly onto said lower housing 12 via the engagement of said external threaded 121 and said internal threaded portion 211. An eye 22 is provided in the lower end of said battery apartment 2.

Within said battery apartment 2, a power supply assembly 3 is fixed. This power supply assembly 3 includes a supporting bracket 31, a battery 32, a positive conducting plate 33, a negative conducting plate 34, a socket 35 and a host lamp 36. On the sides of said supporting bracket 31, there are provided with a clipping groove 311, 312 for fastening said positive and negative conducting plate 33, 34 respectively. Said socket 35 for mounting said host lamp 36 is located above said negative conducting plate 34, while said positive conducting plate 33 has an electrical connection with said host lamp 36. Said supporting bracket 31 extends into said securing hole 122 of said lower housing 12 and has said positive and negative conducting plate 33, 34 in electrical engagement with two conducting plates 131, 132.

An indicating lamp assembly 4 is mounted above said cylindrical projection 111. Within said indicating lamp 4, an LED 41 is installed. Said legs 411, 412 of said LED 41 have electrical connections with said negative conducting plate 13 of said lower housing 12 and said positive conducting plate 33 of said supporting bracket 3 respectively. Said indicating lamp assembly 14 has a recessed clipping plane 42 on its lower end. On said recessed crescent plane 42, a pair of crescent plate 43 are fixed onto the projected rib 421 of said crescent plane 42. Said crescent plate 43 has a bending portion 431 which can construct an electrical connection with said socket 142 of said upper housing 11.

An actuating means 5 is slidable mounted between said indicating lamp assembly 4 and said floating body 1. Said actuating means 5 comprises a neck portion 51. A plurality of supporting spokes 52 are extending axially from said neck, portion 51, and a plurality of floating balls 53 are fixed on the tip of said supporting spokes 52. In the position of said cylindrical projection 111 of which said neck portion 51 is slidable mounted is provided with a conducting ring 54. As said battery 32 is installed onto said supporting bracket 31. The voltage provided by said battery 32 can be guided to said LED 41 via a positive route constructed by said conducting plate 33 and an electrical wire 412, and a negative route constructed by said negative conducting plate 34 and an electrical wire 411. By this arrangement, the LED 41 lights always as said battery 32 is active. This first light indicating source provided by LED 41 can advise tile accurate position of the float.

Figure 5B:
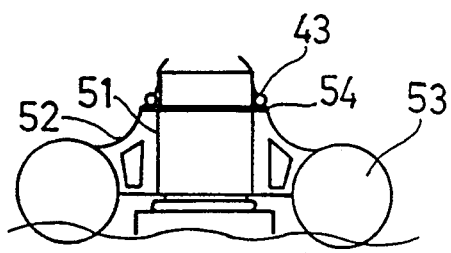
FIG. 5A, 5B are sketch views showing a float is sunk by a hooked fish, wherein the actuating means is triggered.
Figure 4B:
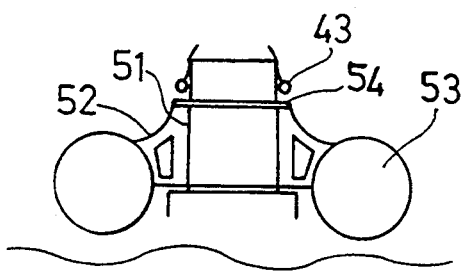
FIG. 4A, 4B are sketch views showing a float is normally floating on the water, wherein the actuating means is above the water.
Figure 5A:
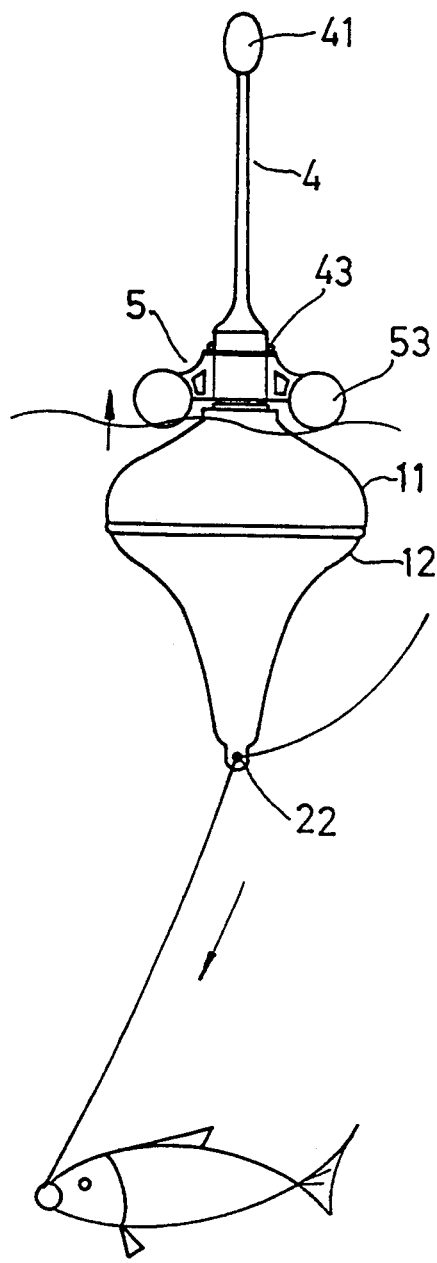
Figure 4A:
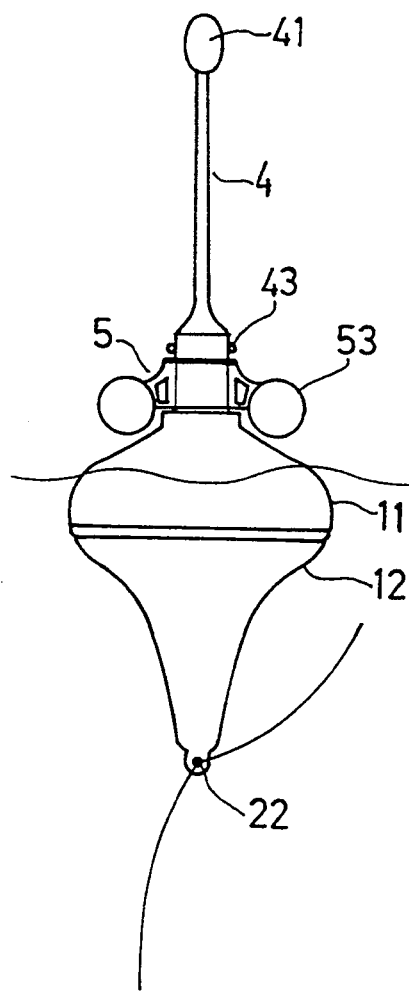

Referring to FIG. 4A, 4B, 5A and 5B, as said floating body 1 is in a normal position, said actuating means 5 is above the water line. In this situation, said conducting ring 54 and said crescent conducting plate 43 (negative) are separated, as shown in FIG. 4A and 4B. As a fish is hooked and draws the floating body 1 down into the water, said floating balls 53 will move said neck portion 51 upward and cause said conducting ring 54 to contact said crescent conducting plate 43 (negative) constructing a electrical engagement, as shown in FIG. 5A and 5B. By this arrangement, said host lamp 36 of said battery 32 are constructing an electrical loop and make the host lamp 36 triggered. The fisherman is clearly and amazingly advised by the instant triggering of said host lamp 36 that a fish is hooked. Not only the information of the hooked fish is clearly advised, the position of the hooked fish underwater is also clearly spotted without any provision of an auxiliary sporting means, The fisherman can readily catch the fish with a landing net without any difficult.

From this above description to a preferable embodiment made according to this instant invention, the skilled in this art can be appreciated that this invention is effective and convenient. And the following advantages can be concluded.

1. This float is integrated with a first light, indicating source and a second light indicating source, wherein said first light indicating source lights as long as the battery is active, while the second light indicating source is triggered as a fish is hooked. The fisherman can readily and clearly be advised by the triggering of the second light indicating source.

2. This float is incorporated with a actuating means for triggering the second light indicating source. In a normal position, this actuating means is in the idle position. As a fish is hooked, this actuating means is triggered by a plurality of floating balls mounting thereon, constructing a electrical connection between the host lamp and the battery installed within said floating body.

3. This triggering of the second light indicating source can be easily distinguished from the first light indicating source. No confusion will be made by this arrangement. Not only the information of the hooked fish is clearly advised, the position of the hooked fish underwater is also clearly spotted without any provision of an auxiliary spot ting means. The fisherman can readily catch the fish with a landing net without any difficult.

Although the present invent ion has been described in connection with the preferred embodiment thereof, many other variations and modifications will now become apparent to those skilled in the art without departing from the scope of the invention. It is preferred, therefore, that the present invention not be limited by the specific disclosure herein, but only by the appended claims.

I claim:

1. A float with light emitting devices, comprising
a floating body comprised of a lower housing and an upper housing, said lower housing having an external engaging means at its lower end, and said upper housing having a cylindrical projection at its upper end, said upper housing and said lower housing defining a compartment therebetween;
a battery compartment having an engaging means for being screwed onto said lower end of said lower housing, a power supply assembly being secured within said battery compartment, said power supply assembly extending into said lower housing;
a first light emitting device being installed on said upper end of said upper housing, said first light emitting device being in electrical connection with said power supply via suitable electrical connections;
a second light emitting device being installed in said compartment defined by said lower and upper housings, said second light emitting device being in electrical connection with said power supply via suitable electrical connections; and
an actuating means slidably mounted on said cylindrical projection of said upper housing comprising a neck portion slidably mounted on said cylindrical projection of said upper housing, said neck portion including a plurality of spokes extending outward, each outer end of said spokes being provided with a floating ball, and wherein
said actuating means remains at an idle position until a fish is hooked, the fish then drawing said floating body downward, said floating balls remaining on a water surface, thereby causing an electrical circuit including the second light emitting source to be closed, thus actuating the second light emitting device.

* * * * *